Patented May 9, 1933

1,908,484

UNITED STATES PATENT OFFICE

ALFRED T. LARSON, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS FOR THE PREPARATION OF CATALYSTS

No Drawing.   Application filed April 27, 1931. Serial No. 533,363.

This invention relates to catalysts and more particularly to the preparation of catalysts suitable for various chemical processes.

It is known that numerous chemical reactions may be accelerated and the yield of final products therein augmented by the use of catalytic agents. Thus, for example, it is known that on passing a mixture containing carbon monoxide and steam, with or without other gases, over catalytic agents reaction takes place resulting in the production of carbon dioxide and hydrogen. Likewise catalytic materials are used in the synthesis of hydrocarbons and alcohols from hydrogen and oxides of carbon and in the synthesis of ammonia.

The preparation of catalysts for use in such reactions involves, however, many practical difficulties because it is desired, insofar as possible, to combine in the catalysts the qualities of high activity, mechanical strength and cheapness.

It is known that catalysts may be prepared possessing one or more of these desirable characteristics but it has been difficult to obtain such catalytic materials combining all the desired properties. Thus, for example, catalysts may be prepared having satisfactory physical ruggedness by melting the ingredients and breaking the solidified melt into particles of suitable size. However, the high density and consequent large consumption of the materials used in manufacturing such catalysts renders this method relatively expensive. Furthermore, although desirable catalysts may be prepared by their formation into pellets, such as in a pharmaceutical tabletting machine, an obstacle to the wide application of this method lies in the inability to form satisfactorily rugged briquettes with many materials unless a binder is used, inasmuch as without the use of binding materials a lack of desired mechanical strength is noticeable.

However, the use of most binders is disadvantageous inasmuch as they tend to decrease the activity of the catalyst and in many cases lose their effectiveness when the catalyst is in operation.

It is known that the heavy metals are useful as catalysts in numerous chemical reactions, such for example as hereinbefore described, and it has previously been proposed to use chromium and compounds thereof as such or with other metals as catalysts, with and without binding materials, but when it is attempted to incorporate chromium or compounds thereof with other metals for catalytic purposes numerous difficulties are encountered. For example, if one starts with a ferric salt and a chromic salt (e. g. $Cr_2(SO_4)_3$) and co-precipitates the corresponding hydroxides by addition of ammonia or an alkali the dried product is likely to be of a hard, brittle, non-briquettable nature, in addition to which is the handicap of relatively high cost of the chromic salt. Such a material must be ground and thereafter incorporated with a binder whereby there arise the problems with reference to binding materials as above described. On the other hand if, in the foregoing procedure, one starts with a ferrous salt and a chromic salt he is under a like disadvantage as to cost of the chromic salt, plus difficulties of washing and filtration.

Again if attempt is made to utilize a higher valence form of a heavy metal, such as ferric iron for example, to prepare a chromate as by adding a soluble chromate to a ferric salt a product is obtained which loses chromate to the mother liquor and to the wash waters so that, aside from the loss of valuable material, the final composition of the product is subject to extreme variation depending upon the concentration of the solutions, temperature of preparation and amount of washing. Furthermore the nearer the product approaches the composition of ferric hydroxide the more likely it is to be obtained in shiny, brittle, non-briquettable grains when dried.

It is an object of this invention to prepare an improved catalyst suitable for use in various chemical reactions and possessing mechanical strength and cheapness as well as high activity.

It is a further object of the invention to provide an improved form of catalyst comprising a heavy metal and chromium and a process for preparing the same.

Other objects and advantages of the invention will be apparent by reference to the following specification in which its preferred details and embodiments are described.

I have found that catalysts containing chromium and a polyvalent metal forming a relatively insoluble hydroxide can be prepared very economically and in a highly active and physically rugged form, by reacting a hexavalent chromium compound with the hydroxide of the other metal in a lower state of oxidation, thereby forming simultaneously and in intimate mixture chromic hydroxide and a higher hydroxide of the other metal. In this way one can prepare very desirable catalysts containing chromium and a polyvalent metal, for example, iron, tin, copper, cerium, manganese and the like.

More specifically I have found that an improved catalyst may be obtained by adding to the solution of a salt of a metal in a lower valence state, for instance ferrous sulfate, a solution containing enough ammonia, alkali, or other soluble hydroxide to precipitate the hydroxide of the metal, e. g., ferrous hydroxide, and thereafter adding to the precipitated mixture a solution of chromic acid or soluble chromate to oxidize the metal hydroxide, e. g., ferrous to ferric hydroxide. At the same time as the metal hydroxide is oxidized as above described the hexavalent chromium is reduced to trivalent chromium and precipitated as chromium hydroxide. According to this method of preparation any amount of chromium can be permanently incorporated in the catalyst up to the maximum quantity resulting from reduction of hexavalent chromium by the other heavy metal in a lower state of oxidation.

Catalysts prepared according to the present invention are highly suitable for use in those reactions to which the catalytic properties of the catalyst constituents makes them adapted. For example, they may be employed in the high pressure synthesis of organic compounds, e. g., methanol, alcohols of higher molecular weight, hydrocarbons, etc., from mixtures of hydrogen and oxides of carbon. They are also particularly suitable for use in the water gas reaction, wherein carbon monoxide and water vapor are converted catalytically to carbon dioxide and hydrogen.

If it is desired to add promoting materials to catalysts prepared in accordance with the invention, they may be dissolved and mixed with the catalyst after filtration.

In carrying out the invention the hexavalent chromium may be added to the metal salt solution either before or after addition of the soluble hydroxide thereto, the order of introduction of the reagents being relatively unimportant.

Although the invention is susceptible of considerable variation in its methods of operation in the preparation of the catalysts, the following examples will illustrate how the invention may be practiced.

*Example 1.*—Three molecular weights of ferrous sulfate are dissolved in water, ammonia is added until the resulting stirred mixture smells slightly ammoniacal and thereafter a solution of one molecular weight of chromic acid is stirred into the mixture. The precipitate is then washed by decantation, filtered, dried, passed through a suitable screen and thereafter fed into a standard tablet making machine and tabletted to form strong, excellently active catalyst tablets for catalyzing the reaction between steam and carbon monoxide to form carbon dioxide and hydrogen, at a temperature of from 300° to 400° C.

*Example 2.*—Three molecular weights of manganous sulfate and two molecular weights of chromic acid are dissolved in water and precipitated at 60° C. by addition of ammonia until the mixture is ammoniacal. The resulting precipitate is then washed, filtered, and dried. The dried material is then briquetted in a known manner and may be used as a highly active catalyst for the production of methanol and higher alcohols from carbon monoxide and hydrogen at elevated pressures and temperatures.

It will be understood that according to the invention more than one heavy metal may, if desired be used in association with chromium in preparing the catalysts.

Various changes may be made in the methods of preparation and composition of the catalysts described without departing from the invention or sacrificing any of the advantages thereof.

I claim:

1. Process for the preparation of a catalyst which includes the step of mixing a solution of a hexavalent chromium compound with a soluble hydroxide and the salt of a heavy metal whose hydroxide is oxidizable by the hexavalent chromium.

2. Process for the preparation of a catalyst which comprises mixing a solution of a hexavalent chromium compound with ammonia and the salt of a heavy metal whose hydroxide is oxidizable by the hexavalent chromium.

3. Process for the preparation of a catalyst which comprises mixing a solution of a hexavalent chromium compound with a soluble hydroxide and an oxidizable salt of an element selected from the group of polyvalent heavy metals consisting of iron, manganese, tin, cerium and copper.

4. Process for the preparation of a catalyst which comprises mixing a solution of a hexavalent chromium compound with ammonia and an oxidizable salt of an element selected from the group of polyvalent heavy metals consisting of iron, manganese, tin, cerium and copper.

5. Process for the preparation of a catalyst which comprises mixing chromic acid with a soluble hydroxide and the salt of a heavy metal whose hydroxide is oxidizable by the chromic acid.

6. Process for the preparation of a catalyst which comprises mixing chromic acid with ammonia and the salt of a heavy metal whose hydroxide is oxidizable by the chromic acid.

7. Process for the preparation of a catalyst which comprises mixing chromic acid with a soluble hydroxide and an oxidizable salt of an element selected from the group of polyvalent heavy metals consisting of iron, manganese, tin, cerium and copper.

8. Process for the preparation of a catalyst which comprises mixing a hexavalent chromium compound with a soluble hydroxide and ferrous sulphate and precipitating together the formed chromic hydroxide.

9. Process for the preparation of a catalyst containing chromium and a polyvalent heavy metal which includes the step of reacting an oxidizable hydroxide of said heavy metal with a hexavalent chromium compound.

10. Process for the preparation of a catalyst which includes the steps of making an aqueous solution, containing a heavy metal salt, slightly alkaline by the addition thereto of a hydroxide soluble in the solution, and thereafter adding a stoichiometric amount of a hexavalent chromium compound, the hydroxide of the heavy metal being oxidizable by the chromium compound.

11. Process for the preparation of a catalyst which includes the steps of making an aqueous solution alkaline by the addition thereto of a hydroxide soluble in the solution, the aqueous solution containing an oxidizable salt of a metal selected from the group of polyvalent heavy metals consisting of iron, manganese, tin, cerium, and copper and thereafter oxidizing the resulting hydroxide of the metal with a hexavalent chromium compound.

12. Process for the preparation of a catalyst which includes the steps of making an aqueous solution, containing three mols of ferrous sulfate, slightly alkaline with ammonia, thereafter adding one mol of chromic acid thereto, and separating the precipitate from the resulting solution.

In testimony whereof I affix my signature.

ALFRED T. LARSON.